United States Patent Office 2,876,207
Patented Mar. 3, 1959

2,876,207

STABILIZED LIQUID COATING COMPOSITION CONTAINING BUTADIENE 1-3 AND METHOD OF PREPARING SAME

Loran A. Henderson, Drexel Hill, Pa., assignor to E. I. du Pont de Nemours and Company, Wilmington, Del., a corporation of Delaware No Drawing. Application June 7, 1956
Serial No. 589,852

19 Claims. (Cl. 260—33.4)

This invention relates to stabilized liquid coating compositions comprising a polymer of butadiene-1,3, a substantially non-volatile organic-solvent-soluble orthotitanate ester or orthozirconate ester and a volatile organic mutual solvent therefore, and to a method of preparing such compositions.

Coating compositions based on polymers of butadiene-1,3 have wide utility and one particular desirable use is as a protective interior lining of tin cans used in food packaging. In the manufacture of such interiorly coated tin-cans, the polymer coating is applied and cured on a ferrous metal sheet, ordinarily applying the coating to one side of the metal sheet only. The resulting coated metal sheet is stamped or cut into appropriate container parts which are subsequently fabricated as interiorly lined metal containers (tin-cans) wherein the coated surface of the metal sheet provides the interior surface of the container. Containers interiorly protected in this manner with suitable organic coatings are used for packaging aqueous wet-pack food products and beverages which ordinarily are heat-processed or pasteurized in the container in direct contact with the protective organic coating.

Although these food-packaging containers are usually designated as tin-cans, the metal substrate used in the manufacture of these containers ordinarily is a ferrous metal sheet having a very thin surface coating of tin. The tin is applied by electrolytic plating or by hot-dipping and the surface coating of tin ordinarily corresponds to about .25 pound of tin per 218 square feet of metal sheet surface and may range up to about 1.5 pounds of tin on said basis. This coating of tin is not adequately protective for use in packaging many wet-pack food products. Hence, protection of the surface must be enhanced by superimposing an adequate organic coating on the tin-coated metal substrate. Suitable organic coatings ordinarily are adequately protective when used at a coating weight corresponding to 2 to 10 milligrams of dry weight coating per square inch of coated metal surface. This coating weight is desirably applied in a single coat.

My copending U. S. patent application Serial No. 571,859, filed March 15, 1956, describes a number of preferred coating compositions based on polymers of butadiene-1,3 and certain organic compounds of titanium which are particularly suitable as protective interior linings of tin cans used in the packaging of food and beverage products. This present application is a continuation-in-part of the above-identified earlier application.

Although practice of the invention embraced by the aforementioned patent application provides commercially acceptable liquid coating compositions, occasionally some of the liquid products were found to advance in viscosity and in some instances gel before the liquid product was applied by the customer. Product control, particularly in reference to viscosity and the non-volatile content of film-forming materials at application viscosity, is significantly pertinent to the application of the product. Hence it is desirable that the liquid product be consistently viscosity-stable and resistant against bodying and gelling, that is, the liquid product desirably should not exhibit a significant advance in viscosity during the interim period from time of its manufacture to time of its application.

The primary object of this invention is to provide improved liquid coating compositions comprising a polymer of butadiene-1,3, certain non-volatile organic-solvent-soluble organic compounds of titanium or zirconium and a volatile organic mutual solvent for the polymer and the modifying organic metal compound, which compositions are characterized by viscosity-stability and resistance to gelation. Another object is to provide viscosity-stable liquid coating products of the aforementioned composition which can be applied as a practical non-volatile coating weight in a single coat. Still another object is to provide a method of preparing these liquid coating compositions which are viscosity-stable and resistant to gelation. A further object is to provide a method of preparing viscosity-stable liquid coating products of the aforementioned composition which can be applied by ordinary coating methods to provide a practical non-volatile coating weight in a single coat.

These and other important objects disclosed hereinafter are accomplished by forming a solution of a film-forming polymer of butadiene-1,3 in a volatile organic solvent therefore comprising a hydrocarbon solvent and mixing into this polymer solution a substantially non-volatile, organic-solvent-soluble organic metal compound selected from the class consisting of orthotitanate esters and orthozirconate esters, in the presence of an amount of an aliphatic monohydric alcohol sufficient to stabilize the viscosity of the liquid composition.

The following specific examples represent the best modes contemplated for practicing the invention, and these illustrative examples are not to be construed as being restrictive in scope except as specifically limited in the appended claims. The parts and percentages are expressed on a weight basis unless otherwise stated.

*Example 1*

| | Parts by wt. |
|---|---|
| Butadiene-1,3 homopolymer | 50.60 |
| Mineral spirits (B. R. 145° C. to 215° C.) | 47.30 |
| 2-ethylhexanol | 1.03 |
| Tetra (2-ethylhexyl) orthotitanate | 1.03 |
| Silicone fluid—General Electric SF–03 | .04 |
| | 100.00 |

The butadiene-1,3 homopolymer was characterized by an average molecular weight of about 1500. This homopolymer was prepared according to the teachings of Miller U. S. Patent 2,708,639 in which process the butadiene-1,3 was polymerized in the presence of $BF_3 \cdot$ etherate·water catalyst.

The silicone fluid was identified as a low viscosity methyl siloxane polymer. Use of the silicone fluid is optional, but it functions advantageously as a wetting agent to facilitate wetting of the ferrous metal sheet with the butadiene polymer coating composition. Eye-holing or formation of islands in the dry coating results when the metal substrate is not properly wet with the liquid coating. Use of the silicone fluid remedies this condition.

In the preparation of the product of Example 1 the butadiene polymer was predissolved in the mineral spirits and thereafter the other components of the composition were added in the indicated order and the entire composition mixed until the product was uniform. Optionally the 2-ethylhexanol and the tetra (2-ethylhexyl) orthotitanate can be premixed and added as a solution of the orthotitanate.

The resulting product was a clear solution having a viscosity corresponding to about Gardner-Holdt "Q" at 25°

C. This viscosity remained constant during shelf storage at room temperature for at least six months.

This product was applied by flow-coating to one surface of a sheet of .25 pound electrolytically tin-plated steel and partially dried by volatile loss of mineral spirits and 2-ethylhexanol from the wet coating. Thereafter the coated ferrous metal sheet was heated in an oven for 10 minutes at 385° F. to cure the coating. The cured coating at a dry coating weight of 5.5 milligrams per square inch of surface was pale golden color, clear, transparent, adherent to the metal substrate, and continuous, that is, free from eye-holding or islands.

*Example 2*

| | Parts by wt. |
|---|---|
| Butadiene-1,3 homopolymer (same as used in example 1) | 50.60 |
| Mineral spirits (B. R. 145° C. to 215° C.) | 48.33 |
| Tetra (2-ethylhexyl) orthotitanate | 1.03 |
| Silicone fluid—General Electric SF-03 | .04 |
| | 100.00 |

In preparing this product, the polymer was predissolved in the mineral spirits and thereafter the orthotitanate and silicone fluid were added and the entire composition was mixed until uniform.

The liquid product exhibited the same initial viscosity as that of the product of Example 1, that is, a viscosity of "Q" Gardner-Holdt at 25° C. This product was applied as a single coat to tin-plated sheet steel and cured thereon as described in Example 1. The resulting cured coating on the metal sheet was equivalent to that obtained in Example 1.

Although the freshly prepared liquid product of Example 2 was satisfactorily used immediately after the orthotitanate ester was mixed into the composition, this product bodied during storage and, after standing several hours at room temperature, exhibited a viscosity of "U" Gardner-Holdt. This product which had bodied could not be adequately diluted with mineral spirits to the original viscosity for practical application. About 2% of 2-ethylhexanol was added and mixed into this bodied liquid product of Example 2. There was a visually detectable decrease in the consistency of the liquid and the viscosity was returned to approximately the initial value as a result of the addition of the alcohol. This product coated and cured on tin-plated sheet steel as described, yielded a cured coating comparable in physical properties such as appearance, adhesion, flexibility and coating weight as that obtained in coating the metal with the liquid product of Example 1.

The sheet metal stock coated with the cured products of Example 1 and Example 2 was stamped into container body parts and container end-closures for subsequent fabrication as a cylindrical metal container having the metal surface coated with the cured organic coating as the interior surface of the container.

Representative samples of the stamped container parts were examined for coating fracture which may be caused by the mechanical operations of stamping the coated metal sheet. The tested container parts coated with the products of Example 1 and Example 2 respectively showed excellent resistance to fracturing under the mechanical operations of container fabrication. Fracture-resistance was superior to that ordinarily accepted by the trade as representative of organic coatings in commercial use for can coating.

The coated container parts were fabricated as a container constituting a cylindrical body part with a soldered side seam and an end-closure double-seamed to the body part with the coated surfaces of the metal constituting the interior surface of the containers. The resulting interiorly coated containers were tested by actually heat-processing representative wet-pack food products in the container in direct contact with the organic coating according to established test methods used by the container industry. Sour cherries, pumpkin, corn and pork were used as representative food products in the processing tests. Depending on the particular processed food product, heat-processing was carried out in a steam pressure cooker under conditions ranging from about 15 minutes at 210° F. to 150 minutes at 250° F. with the pressure as high as that corresponding to steam at a temperature within the indicated range. Each of the hermetically sealed food-filled containers had about one quarter inch of head space as air.

All of the test containers having a content of processed food products were immediately cooled to room temperature after heat-processing and stored for at least 18 hours before representative sealed containers were opened for initial examination. Other series of hermetically sealed test containers filled with processed food were stored for subsequent inspection after periods of 1, 2 and 3 months storage at room temperature and storage at 100° F., and after 1, 2 and 4 weeks storage at 120° F.

After the respective storage periods, the containers were opened and the interior surfaces thereof were examined for blistering, blushing, discoloration or staining, adhesion to the metal substrate, flaking and softness. In the initial examination after heat-processing of wet-pack food in the container, examination was also made for fracturing of the coating as may be caused by expansion and contraction of the metal container during processing of the food.

The cured coatings of the products of Example 1 and Example 2, identical in composition in the cured state, were resistant to physical and chemical attack by aqueous extracts or juices of wet-pack food products during heat-processing in the container and during the respective storage periods of such food extracts and parent food products in direct contact with the organic coatings. The coatings were blush-resistant and blister-resistant. For all practical consideration, the coatings were unchanged from their initial quality in reference to hardness, flexibility, color, clarity and adhesion.

Because processing of pork and corn ordinarily causes some staining of the interior surface of the container due to the sulfur content of these food products, it is desirable to include in the coating a sulfur sequestering agent, such as zinc oxide, which sequesters the sulfur in an apparently non-staining or non-discoloring form. Sulfur sequestered as zinc sulfide is visually undetectable in the presence of zinc oxide. Example 3 below is representative of using zinc oxide as a sulfur sequestering agent in the invention compositions.

*Example 3*

| | Parts by wt. |
|---|---|
| Butadiene homopolymer (same as used in Example 1) | 35.70 |
| Mineral spirits (B. R. 145° C. to 215° C.) | 47.88 |
| 2-ethylhexanol | 3.00 |
| Tetra (2-ethylhexyl) orthotitanate | 1.50 |
| Silicone fluid—General Electric SF-03 | .02 |
| Zinc oxide paste | 11.90 |
| | 100.00 |

The zinc oxide paste had the following composition:

| | Parts by wt. |
|---|---|
| Lead-free zinc oxide pigment | 41.0 |
| Butadiene homopolymer (same as used in Example 1) | 23.0 |
| Mineral spirits (B. R. 145° C. to 215° C.) | 36.0 |
| | 100.0 |

The zinc oxide was dispersed in the hydrocarbon solution of butadiene polymer in accordance with a conventional method of dispersing pigment in paste form.

In the preparation of the product of Example 3, the components were mixed until the product was uniform. The zinc oxide content of the product was about 12.7% by weight based on the polymer content. The product was viscosity-stable during storage, no bodying or gelation occurring.

Containers having an interior coating of the cured product of Example 3 at a coating weight of about 6 milligrams per square inch applied as described in Example 1 were found to be fully acceptable for packaging wet-pack food products which are heat-processed in the container. The results in the specific tests were equivalent to those obtained with the product of Example 1, with the added advantage that the interior coated surface of the container was resistant to sulfur-staining by pork and corn products.

*Example 4*

| | Parts by wt. |
|---|---|
| Butarez 25, liquid polybutadiene | 40.0 |
| Mineral spirits (B. R. 145° C. to 215° C.) | 57.3 |
| Octyleneglycol titanate—Du Pont's OGT–21 Solution. 76% by wt. in butanol | 2.7 |
| | 100.0 |

The several components of the composition were mixed until the product was uniform.

The Butarez 25, liquid polybutadiene, was Phillips Petroleum Company's commercially available homopolymer of butadiene-1,3. This polymer had an average molecular weight of about 1500.

Du Pont's OGT–21, octylene glycol titanate, was the commercially available chelated titanium ester prepared by alcoholysis of tetrabutyl titanate in the proportion of one mol of the tetrabutyl titanate per two mols of 2-ethylhexanediol-1,3. Hence, this chelated titanium derivative contained a pair of butoxy substituents in addition to the two chelated substituents per titanium atom. This chelate is described in the Du Pont publication Titanium Organic-Titanium Chelates.

The resulting product, which contained about 32% of butanol based on the weight of the titanium derivative, was viscosity-stable and gelation-resistant. The coating resulting from curing this product on tin-plated sheet steel was acceptable for interiorly lining of containers used in wet-pack food processing and packaging.

*Example 5*

| | Parts by wt. |
|---|---|
| Butadiene homopolymer (same as used in Example 1) | 37.50 |
| Mineral spirits (B. R. 145° C to 215° C.) | 59.48 |
| Tetra (2-ethylhexyl) orthotitanate solution—50% by wt. in 2-ethylhexanol | 1.50 |
| Ethylacetoacetate | 1.50 |
| Silicone fluid—General Electric SF–03 | .02 |
| | 100.00 |

The components of the composition were added in the indicated order and mixed until the product was uniform.

In this composition a titanium chelate was formed in situ by alcoholysis between the tetra (2-ethylhexyl) orthotitanate and the enolizable ethylacetoacetate, a beta-ketoacid ester. The liquid product was viscosity-stable and gelation resistant. This product contained 2-ethylhexanol liberated by alcoholysis in addition to the alcohol introduced directly.

Evaluation of the product of Example 5 as an interior coating for food-processing containers following the previously described procedure yielded excellent results which were equal to those obtained with the products of the preceding examples.

*Example 6*

| | Parts by wt. |
|---|---|
| Butarez 25, liquid polybutadiene (same as used in Example 4) | 40.0 |
| Mineral spirits (B. R. 145° C. to 215° C.) | 55.0 |
| Methyl isobutyl carbinol | 3.0 |
| Polymeric isopropoxytitanium oleate | 2.0 |
| | 100.00 |

The components of the composition were mixed until the product was uniform.

The polymeric isopropoxytitanium oleate was Du Pont's commercially available Trola, isopropoxytitanium oleate, described in the Du Pont publication Titanium Organics-Titanium Acylates. This titanium acylate contains an average of about one acylate group per titanium atom, the remaining substituents on the titanium atoms being isopropoxy groups.

The resulting liquid product of Example 6 was viscosity-stable and resistant to gelation.

*Example 7*

| | Parts by wt. |
|---|---|
| Butarez 25, liquid polybutadiene (same as used in Example 4) | 40.00 |
| Maleic anhydride | .25 |
| Mineral spirits (B. R. 145° C. to 215° C.) | 56.75 |
| Tetra (2-ethylhexyl) orthotitanate solution (40% in 2-ethylhexanol) | 3.00 |
| | 100.00 |

In the preparation of this product, the oily butadiene polymer was run to a temperature of 210° F. in 30 minutes, the maleic anhydride was slowly added to the hot oil while the temperature was raised to 300° F. in 20 minutes and the mixture was vigorously agitated while the temperature was held at 300° F. for 45 additional minutes. Thereafter, the mixture was cooled by dilution with the mineral spirits and the solution of tetra (2-ethylhexyl) orthotitanate in 2-ethylhexanol was added and uniformly mixed into the composition to complete the product. This liquid product was viscosity-stable and gelation resistant.

This product was flow-coated and cured on electrolytic tin-plated sheet steel and, in turn, fabricated as interiorly coated containers. Containers interiorly coated with this product were found to be equivalent to those coated with the product of Example 1.

Citraconic anhydride substituted on an equal weight basis for the maleic anhydride in the preparation of the product of Example 7 provides a viscosity-stable liquid coating composition equally suitable for use in interiorly coating containers for food packaging.

*Example 8*

| | Parts by wt. |
|---|---|
| Butadiene/styrene copolymer | 43.5 |
| High solvency petroleum naphtha (B. R. 130° C. to 195° C.) | 26.2 |
| Mineral spirits (B. R. 145° C. to 215° C.) | 25.0 |
| 2-ethylhexanol | 4.0 |
| Tetra (2-ethylhexyl) orthotitanate | 1.3 |
| | 100.0 |

The copolymer had a molecular weight of about 1200 and contained about 90.8% by weight of polymerized butadiene-1,3 and 9.2% polymerized styrene, the polymerization being carried out in the presence of sodium/ naphthalene catalyst.

The resulting liquid product was viscosity-stable and gelation resistant. This product applied to a tin-plated ferrous sheet metal substrate and evaluated as previously described was found to be adequately fracture-resistant, flexible and suitably resistant chemically and physically for use as an interior coating of containers designed for packaging wet-pack food product.

Commercially available Standard Oil Company's "C" oil, a copolymer of butadiene-1,3 and styrene comparable with the copolymer used in Example 8, substituted on an equal weight basis for the copolymer in that example provides a viscosity-stable product which is equivalent in quality in the cured state when comparatively evaluated as an interior can coating. "C" oil, butadiene/styrene copolymer, substituted on an equal weight basis for the Butarez 25 oil, butadiene homopolymer, in Example 7 and treated with maleic anhydride as described therein also provides a viscosity-stable liquid product which on curing yields an equivalent product suitable for container coating.

*Example 9*

|  | Parts by wt. |
|---|---|
| Butadiene/styrene copolymer-"C" oil | 50.60 |
| Mineral spirits (B. R. 145° C. to 215° C.) | 47.14 |
| 2-ethylhexanol | 1.11 |
| Tetra (2-ethylhexyl) orthozirconate | 1.11 |
| Silicone fluid—General Electric SF-03 | .04 |
|  | 100.00 |

This composition is similar to that of Example 1 except that Standard Oil Company's "C" oil, butadiene/styrene copolymer, having a molecular weight of about 1200 was substituted for the butadiene-1,3 homopolymer and tetra (2-ethylhexyl) orthozirconate was substituted on an equimolar basis for the tetra (2-ethylhexyl) orthotitanate. The components were mixed as described in the preparation of the product of Example 1. The resulting liquid product was viscosity stable and resistant to gelation. The product comparably applied and cured on tin-plated sheet steel was found to be equivalent to the cured product of Example 1 and useful as a protective coating for interiorly lining tin-cans.

The pertinent stabilizing component of these several illustrative examples is the aliphatic monohydric alcohol which provides the liquid product with viscosity stability and resistance to gelation. At least 30% of the alcohol based on the weight of the soluble organic compound of titanium or zirconium is required to provide a practical improvement in stability. The preferred concentration of the alcohol is in the range of 50% to 250% based on the weight of the soluble organic compound of titanium or zirconium. Higher concentrations of the alcohol can be used, but ordinarily there is no practical advantage in using more than 400% by weight of the alcohol on the indicated basis.

The examples illustrate the use of only a few of the species of the stabilizing aliphatic monohydric alcohol which preferably contains from 4 to 10 carbon atoms per molecule. Particularly preferred species contain from 6 to 8 carbon atoms per molecule.

Useful aliphatic monohydric alcohols are not limited to the indicated preferred species. Higher alcohols having up to 20 carbon atoms are operative toward stabilizing the viscosity of the product and can be used provided they are soluble or miscible in the liquid composition and provided any residues of these less volatile alcohols can be tolerated in the dry coating. Lower alcohols having fewer than 4 carbon atoms are also operative toward stabilizing the viscosity of the product and can be used provided they are substantially anhydrous, compatible with the liquid composition, and their high volatility can be tolerated during application of the liquid coating composition. These stabilizing aliphatic alcohols can be saturated, olefinically unsaturated or acetylenically unsaturated.

Suitable operative alcohols which can be effectively substituted for the stabilizing alcohols in the examples, for example, include: methanol, ethanol, propanol, isopropanol, butanol, isobutanol, tertiary butanol, 1-pentanol, 2-pentanol, 3-pentanol, 1-hexanol, 2-hexanol, 3-hexanol, cyclohexanol, methylisobutyl carbinol, 1-heptanol, 2-heptanol, 3-heptanol, 4-heptanol, 1-octanol, 2-ethylhexanol, 2-ethylbutanol, diisopropyl carbinol, 2-octanol, 1-nonanol, 1-decanol, lauryl alcohol, cetyl alcohol, stearyl alcohol, oleyl alcohol, methyl cyclohexanol, 3,3,5 trimethyl cyclohexanol, methoxymethoxyethanol, ethyleneglycol monomethylether, ethyleneglycol monoethylether, ethyleneglycol monobutylether, ethyleneglycol mono 2-ethylhexylether, crotyl alcohol, methylvinyl carbinol, benzyl alcohol, phenylethyl alcohol, cinnamyl alcohol, propynol and butyn-1-ol-4. Ordinarily the substitution can be made on an equal weight basis. However, substitution should preferably be made on an equal molar basis, particularly with the higher molecular weight alcohols, in compositions containing less than 100% of the stabilizing alcohol based on the weight of the organic metal compound.

Hydrocarbon solvents are preferably used as the principal volatile inert organic mutual solvent for the butadiene polymer and the organic compound of titanium or zirconium.

Any of the volatile aromatic hydrocarbons, aliphatic hydrocarbons and mixtures thereof which ordinarily have a boiling range within the limits of about 80° C. to about 220° C., and are used in conventional varnish and paint formulations can be used as the mutual solvent in the liquid coating compositions of this invention. They are also useful as diluents for adjusting the compositions to a desired application consistency. For economical reasons, mineral spirits, V. M. and P. naphtha, and petroleum naphthas are ordinarily preferred over the aromatic solvents such as toluol and xylol. Esters, ketones and other conventional volatile compatible organic solvents can be used in admixture with the hydrocarbon solvents and the pertinent stabilizing alcohols when the presence of these modifying volatile diluents is desired for a particular purpose. It is preferred that the solvent or diluent be substantially free from water as many of the organic-solvent-soluble titanium and zirconium compounds are susceptible to objectionable hydrolysis.

Polymers of butadiene-1,3 useful in the practice of this invention are desirably selected from the group consisting of butadiene-1,3 homopolymers, copolymers of butadiene-1,3 with styrene in which the butadiene-1,3 is in preponderance, preferably at least 75% by weight, and such homopolymers and copolymers of butadiene-1,3 modified with a minor proportion of maleic anhydride or citraconic anhydride, ordinarily not more than about 2% by weight of the anhydride.

The butadiene-1,3 homopolymers useful in the practice of this invention can be prepared by polymerization of butadiene-1,3 catalyzed by either sodium, boron trifluoride, boron trifluoride etherate complex or boron trifluoride etherate complex and water. These homopolymers can be prepared by either a single stage process or by a two-stage process in which the preformed polymer is subjected to further treatment with a Friedel-Crafts catalyst as described in Garber U. S. Patent 2,560,164 or subjected to heat-bodying.

Copolymers of butadiene-1,3 and styrene in which the butadiene-1,3 component is at least 75% by weight of the copolymer can be used in place of any of the polymers of butadiene-1,3 specified in the examples. Preparation of useful copolymers of this type is described in Gleason U. S. Patent 2,672,425.

These homopolymers and copolymers treated with either maleic anhydride or citraconic anhydride in an amount ranging up to about 2% based on the weight of the polymer can also be successfully used in the practice of this invention. Anhydride modified polymers of this type are described in Gleason U. S. Patent 2,652,342 and in Miller U. S. Patent 2,708,639. Modification with the acid anhydride can be carried out either as an after-treatment of the preformed polymer or during the polymerization of the butadiene polymer. Polymers of butadiene in which the content of modifying maleic or citraconic anhydride is greater than 2%, such as up to 10%, can be used in admixture with unmodified butadiene polymer in an amount such that the total content of the acid anhydride does not exceed 2% based on the total weight of the polymer and preferably is no greater than about 1% on this basis.

The preferred polymers of butadiene-1,3 are oily liquid polymers having an average molecular weight ranging from about 1000 to about 5000. Satisfactory coatings can also be prepared from polymers of butadiene-1,3 having an average molecular weight ranging from about 700 to about 20,000. When higher molecular weight polymers are used in the practice of the invention, the non-volatile content of the resulting coating composition ordinarily is too low at conventional application viscosity for practical use, particularly where it is desirable to apply an adequately protective coating weight in a single coat.

The liquid coating compositions of this invention can be satisfactorily applied by conventional means at a non-volatile content as high as 70% by weight. Although the primary utility of these products in the container field requires a substantially high non-volatile content at application viscosity to provide a preferred dry coating weight of about 2 to 10 milligrams per square inch of surface in a single coat, the products can contain as little as 10% non-volatile content and be recognized as practical where application by a plurality of coats is acceptable.

A wide variety of substantially non-volatile, organic-solvent-soluble orthotitanate esters or ortho-zirconate esters is useful in modifying the polymer of butadiene-1,3 in the practice of this invention. These orthotitanates and orthozirconates are desirably selected from the following types of esters:

(1) Orthotitanate esters of aliphatic monohydric alcohols,
(2) Orthozirconate esters of aliphatic monohydric alcohols,
(3) Orthotitanate esters of 2,3 diorgano-substituted 1,3 diols,
(4) Orthozirconate esters of 2,3 diorgano-substituted 1,3 diols,
(5) Orthotitanate esters of enolizable beta-ketoacid esters,
(6) Orthozirconate esters of enolizable beta-ketoacid esters,
(7) Titanium acylates of fatty oil acids,
(8) Zirconium acylates of fatty oil acids.

Ordinarily at least 1% of at least one of these organic compounds of titanium or zirconium based on the weight of the butadiene polymer is required to register a practical improvement in the properties of the coating derived from the butadiene polymer. No significant advantages were found in using more than 10% by weight of these organic metal compounds based on the weight of the butadiene polymer, although no adverse effects were observed when the concentration was as high as 15% by weight on the indicated basis. A concentration of the organic metal compound in the range of about 1.5% to 6.0% based on the weight of the butadiene polymer is preferred.

Tetra-(2-ethylhexyl) orthotitanate is a particularly preferred member of the group of substantially non-volatile orthotitanate esters of aliphatic monohydric alcohols useful in the practice of this invention. Any of the orthotitanate esters or corresponding orthozirconate esters of 6 to 20 carbon atom aliphatic monohydric alcohols or mixtures thereof can be used in place of the preferred 2-ethylhexyl orthotitanate. Volatility of the lower esters, such as the orthotitanate or orthozirconate esters of ethyl, isopropyl, butyl or amyl alcohol is too significant for satisfactory use as the sole titanium or zirconium ester in the invention compositions. However, these volatile esters can be present in minor proportions in admixture with the substantially non-volatile esters of titanium or zirconium.

Orthotitanate esters of 2-ethylhexanediol-1,3 are particularly preferred among the titanium chelates useful in the practice of this invention. Other useful titanium chelates can be prepared following the teachings of Bostwick U. S. Patent 2,643,262 where these chelates are prepared by alcoholysis of a tetraorthotitanate ester of a lower alcohol with a 2,3 diorgano-1,3 diol having the general formula

R—CHOH—CHR'—CH$_2$OH where R and R' are alkyl hydrocarbon radicals whereof the sum of the carbon atoms in R and R' total from 3 to 7 carbon atoms. The corresponding zirconium chelates can be used on an equivalent basis.

These chelated derivatives can be formed in situ in the liquid coating composition by alcoholysis between the titanium or zirconium derivative introduced into the liquid coating composition as the tetrabutyl ester, or similar ester of a volatile alcohol, and a 2,3 diorgano-1,3 diol of the aforementioned general formula.

When these chelates are formed in situ by alcoholysis of a tetraorthotitanate or tetraorthozirconate ester of an alcohol such as butanol or 2-ethylhexanol, the amount of alcohol liberated by the reaction ordinarily is adequate to stabilize the composition.

Another useful class of chelates are the orthotitanate esters and orthozirconate esters of enolizable beta-keto-acid esters of which the orthotitanate ester of ethylacetoacetate is preferred. These chelates can be formed conveniently in situ in the liquid coating composition by alcoholysis between ethylacetoacetate or a similar enolizable beta-ketoacid ester introduced into the composition in combination with a tetraorthotitanate ester or tetraorthozirconate ester of a volatile alcohol. Useful chelating beta-ketoacid esters are of the general formula:

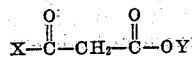
$$X-\overset{O}{\underset{\|}{C}}-CH_2-\overset{O}{\underset{\|}{C}}-OY$$

which is enolizable to:

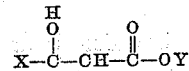
$$X-\overset{OH}{\underset{|}{C}}=CH-\overset{O}{\underset{\|}{C}}-OY$$

where X and Y are each saturated hydrocarbon radicals having from 1 to 6 carbon atoms, X and Y being alike or different. Typical beta-ketoacid esters useful in the alcoholysis reaction include for example the methyl, ethyl, propyl, butyl, amyl, hexyl, and cyclohexyl alcohol esters of acetoacetic acid (beta-oxo-butyric acid), beta-oxo-valeric acid, beta-oxo-caproic acid, beta-oxo-caprylic acid, and beta-oxo-cyclohexanepropionic acid.

Titanium or zirconium acylates useful in the practice of this invention are identifiable as orthotitanate or orthozirconate esters. They are also referred to as ester anhydrides in which the ortho acid of the metal is partially anhydrided with the fatty acid and partially esterified with an aliphatic monohydric alcohol. These acylates can be either monomeric or polymeric materials. The titanium acylates can be prepared by reacting a monomeric or polymeric orthotitanate ester of a lower alcohol with an 8 to 20 carbon atom fatty acid as described in Langkammerer U. S. Patent 2,621,193, Haslam 2,621,196 and Boyd 2,666,772.

Preferred metal acylates are characterized by the general formula

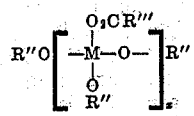
$$R''O\left[-\underset{\underset{R''}{\overset{|}{\overset{O}{|}}}}{\overset{O_2CR'''}{\overset{|}{M}}}-O-\right]R''$$

where M is titanium or zirconium, R'' is a hydrocarbon radical of a lower aliphatic monohydric alcohol, such as isopropyl alcohol or butyl alcohol, and the radical R'''CO₂ is the fatty acid acyl radical. X is a digit ordinarily in the range of 1 to 100, the average molecular weight of the polymeric metal acylate ordinarily ranging up to about 40,000. Hydrolysis of acylates of the above general formula results in replacement of the R'' substituent by hydrogen. Acylates having this general formula can also be subjected to alcoholysis for replacement of the R'' substituent with a hydrocarbon radical having a larger number of carbon atoms than R'' to provide a still greater variety of useful metal acylates.

Liquid acylates of titanium or zirconium, such as isopropoxy titanium oleate or isopropoxy zirconium oleate, are preferred among the useful acylates of fatty oil acids having the aforementioned general formula. The liquid acylates offer the advantage of being easily mixed with the butadiene polymer solution as compared with the waxy solid metal acylates. Other useful polymeric and monomeric acylated orthoesters of titanium or zirconium include butoxy titanium oleate, isopropoxy- and butoxy titanium acylates of lauric acid, coconut oil acids, soya oil acids, linseed oil acids, castor oil acids and tall oil acids, and the corresponding zirconium acylates. The zirconium acylates ordinarily can be substituted on an equal weight basis for the titanium acylyates as well as on an equimolecular basis.

For use in can coating the compositions of this invention ordinarily are used as clear unpigmented products. However, the coating compositions can include pigments, extenders, fillers, lakes and dyes in amounts conventionally used in varnish, enamel, and paint formulation.

The coating compositions can also advantageously contain still other functional modifiers, for example, metal driers such as iron, cobalt and manganese salts of 2-ethylhexoic acid. Liquid siloxane polymers are desirably included in the composition to alter the surface characteristics of the applied coating. The coating compositions can also contain compatible resins and plasticizers in minor proportions. The trialkyl orthophosphates, particularly tri-2-ethyl-hexyl-phosphate, were found to be excellent flexibilizers and when used in the range of about 1% to 5% based on the weight of the butadiene polymer were found to advantageously improve the cure.

In applying the invention compositions to ferrous metal substrates used in container fabrication, such as tin-plated sheet steel, sheet steel, terne-plate and aluminum clad steel, the coating after substantial volatile loss of solvent is cured by heating the coated substrate preferably at an approximate temperature of 385° F. for a period of 5 to 15 minutes. Other temperatures in the range of 250° F. to 420° F. can be used to equivalently cure the coatings by correspondingly altering the heating or baking period in the range of about 60 to 5 minutes. A curing temperature as low as about 200° F. is operative but a long curing time at this temperature ordinarily is impractical for commercial operations. Use of curing temperatures above 420° F. up to the decomposition temperature does not permit a significant reduction in curing time below the indicated 5 minutes preferred minimum. In the presence of metallic driers, the coatings will air-dry or cure to a tack-free state, but the coatings are preferably cured by baking. Heating can be accomplished by any of the conventional means used in the coating industry.

Any of the conventional methods can be used to apply the liquid coating compositions of the invention. However, for coating of sheet metal used in container fabrication, roller coating is a preferred method as the desired coating weight is easily and conveniently applied in a single coat and the liquid coating can be applied at a non-volatile content as high as about 70% by weight. For general coating purposes spraying, dipping and flow-coating are also useful methods of application.

The preferred coating weight for coating ferrous metal sheet substrates with an adequately protective organic coating for use as an interior coating of containers used in the packaging of wet-pack food products is in the range of 2 to 10 milligrams of dry coating per square inch of surface. At coating weights lower than 2 milligrams per square inch the coating ordinarily is not sufficiently protective and not adequately fracture-resistant to either the mechanical operations of container fabrication or the conditions associated with heat processing the food products. No significant advantages are recognized in applying a coating weight greater than 10 milligrams per square inch of surface in container manufacture. Coating weights greater than this can be used when the clear or pigmented products are to serve as general purpose decorative and protective coatings. The coating can represent either the entire surface coating on the substrate or at least one layer of a composite surface coating consisting of a plurality of layers. For example, the coating can be applied as the primer coat directly on the substrate with at least one conventional top-coat finish applied thereover or a conventional coating can be used as the undercoat with the invention composition used as the top-coat finish.

This invention provides desirable improvements in liquid coating compositions comprising certain butadiene-1,3 polymers, certain organic-solvent-soluble orthotitanate esters or orthozirconate esters and a volatile organic solvent for the polymer and the organic metal compound. The improvement resides in providing the liquid composition with resistance to gelation and with viscosity stability. Liquid solutions of butadiene-1,3 polymers are susceptible to bodying and gelation to varying degrees when desirably modified with certain soluble derivatives of titanium and zirconium. The presence of the stabilizing monohydric alcohol in the composition successfully inhibits bodying and gelation and provides viscosity-stability which is pertinent to commercial use of these coating compositions. The invention compositions can be stored and transported to the consumer with assurance that the viscosity is practically the same as the original viscosity of the product as manufactured. The product can be supplied as a stable single-package composition, whereas, heretofore, the product was ordinarily supplied in two parts to be combined immediately prior to use by the consumer. One part consisted of a liquid solution of the butadiene polymer and the other was comprised essentially of the soluble organic compound of titanium or zirconium. Supplying the product as a two unit package did not provide full assurance that the product resulting from the combined two units would in every case be free from rapid bodying or gelation before the product was completely consumed.

Addition of the pertinent stabilizing alcohol into the liquid butadiene-1,3 polymer compositions which have already increased in viscosity, bodied or gelled due to the presence of the modifying organic titanium or zirconium compound provides an opportunity to salvage the compositions as useful products by restoring the viscosity to substantially its initial value prior to bodying. However, this practice is operable only if the existing bodying or gelation is in a potentially reversible state. Ordinarily the bodying is potentially reversible, but when the solution of butadiene-1,3 polymer includes other organic film-forming materials reactive with the organic metal compounds of titanium or zirconium and capable of being highly crosslinked thereby, the bodying is irreversible and subsequent addition of the alcohol is ineffective. However, presence of the alcohol in the same composition at the time the organic metal compound is added is effective toward inhibiting bodying or gelation.

The described advantages and improvements are accomplished without affecting the cure of the composition or the characteristics of the cured product.

While there are disclosed above but a limited number of embodiments of the coating compositions, processes and products of the invention, it is possible to produce still other embodiments without departing from the inventive concept herein disclosed, and it is desired therefore that only such limitations be imposed on the appended claims as are stated therein or required by the prior art.

The embodiments of this invention in which an exclusive property or privilege is claimed are defined as follows:

1. A liquid coating composition characterized by viscosity-stability and resistance to gelation consisting essentially of (A) at least one oily polymer of butadiene-1,3 having a molecular weight from 700 to 20,000 and selected from the group consisting of (1) homopolymers of butadiene 1,3, (2) copolymers of butadiene 1,3 and styrene, the proportion of copolymerized butadiene 1,3 being at least 75% by weight of said copolymer, (3) said homopolymers (1) and said copolymers (2) modified with a minor amount of maleic anhydride and (4) said homopolymers (1) and said copolymers (2) modified with a minor amount of citraconic anhydride, said anhydrides being present in an amount no greater than 2% based on the weight of said polymers (1) and (2), (B) a substantially non-volatile organic-solvent-soluble organic metal compound selected from the class consisting of orthotitanate esters and orthozirconate esters in an amount from 1% to 15% based on the weight of (A), (C) a volatile liquid organic mutual solvent for (A) and (B) having a boiling range within the limits of 80° C. to 220° C. and consisting essentially of at least one hydrocarbon solvent, and (D) an aliphatic monohydric alcohol in a stabilizing amount from at least 30% to about 400% based on the weight of said organic metal compound, component (B), the non-volatile content being from about 10% to 70% by weight of the composition.

2. The composition of claim 1 wherein said stabilizing alcohol, component (D), is present in an amount from 50% to 250% based on the weight of said organic metal compound, component (B).

3. The composition of claim 1 wherein said stabilizing alcohol, component (D), is an aliphatic alcohol having from 4 to 10 carbon atoms per molecule.

4. The composition of claim 1 wherein said stabilizing alcohol is 2-ethylhexanol.

5. The composition of claim 1 wherein said oily polymer of butadiene-1,3, component (A), is a homopolymer.

6. The composition of claim 1 wherein said oily polymer of butadiene-1,3, component (A), is a copolymer of butadiene-1,3 and styrene, the proportion of copolymerized butadiene-1,3 being at least 75% by weight.

7. The composition of claim 1 wherein said oily polymer of butadiene-1,3, component (A), is butadiene-1,3 homopolymer modified with maleic anhydride in an amount no greater than 2% based on the weight of said polymer.

8. The composition of claim 1 wherein said organic metal compound, component (B), is tetra (2-ethylhexyl) orthotitanate.

9. The composition of claim 1 wherein said organic metal compound, component (B), is tetra (2-ethylhexyl) orthozirconate.

10. The composition of claim 1 wherein said organic metal compound, component (B), is the orthotitanate ester of 2-ethylhexanediol 1,3.

11. The composition of claim 1 wherein said organic metal compound, component (B), is polymeric isopropoxytitanium oleate.

12. The liquid coating product of claim 1 wherein said organic metal compound, component (B), is the orthotitanium ester of enolized ethylacetoacetate.

13. The composition of claim 1 wherein said organic metal compound (B) is present in an amount from 1.5% to 6.0% based on the weight of said polymer (A), said stabilizing alcohol (D) is present in an amount corresponding to 50% to 250% based on the weight of said organic metal compound, said polymer of butadiene-1,3 having an average molecular weight in the range of 1000 to 5000 and being present in an amount corresponding to the total weight of (A) plus (B) being in the range of 10% to 70% based on the total composition, and said volatile organic solvent, component (C), is a hydrocarbon having a boiling range within the limits of about 80° C. and about 220° C.

14. A method of preparing a liquid coating composition characterized by viscosity-stability and resistance to gelation, which comprises forming a liquid solution of (A) at least one oily polymer of butadiene-1,3 having a molecular weight from 700 to 20,000 and selected from the group consisting of (1) homopolymers of butadiene-1,3, (2) copolymers of butadiene-1,3 and styrene, the proportion of copolymerized butadiene-1,3 being at least 75% by weight, (3) said homopolymers (1) and said copolymers (2) modified with a minor amount of maleic anhydride and (4) said homopolymers (1) and said copolymers (2) modified with a minor amount of citraconic anhydride, said anhydrides being present in an amount no greater than 2% based on the weight of said polymers (1) and (2), in (C) a volatile liquid organic mutual solvent for (A) and (B) having a boiling range within the limits of 80° C. to 220° C. and consisting essentially of at least one hydrocarbon solvent, mixing said solution with (B) a substantially non-volatile, organic-solvent-soluble organic metal compound selected from the class consisting of orthotitanate esters and orthozirconate esters in an amount from 1% to 15% based on the weight of component (A) in the presence of (D) at least one aliphatic monohydric alcohol having from 4 to 10 carbon atoms per molecule in a stabilizing amount from at least 30% to about 400% based on the weight of said organic metal compound, component (B), the non-volatile content of the composition being from about 10% to 70% by weight.

15. The method of claim 14 wherein said stabilizing alcohol, component (D), is added to said solution of said polymer component (A) prior to admixing the organic metal compound, component (B).

16. The method of claim 14 wherein said stabilizing alcohol, component (D), is premixed with said organic metal compound, component (B), prior to addition to said solution of said polymer of butadiene-1,3.

17. A method for preventing a significant increase in viscosity of a liquid coating composition consisting essentially of a solution of (A) at least one oily polymer of butadiene-1,3 having a molecular weight from 700 to 20,000 and being selected from the group consisting of (1) butadiene-1,3 homopolymer, (2) copolymers of butadiene-1,3 and styrene having at least 75% by weight of copolymerized units of butadiene-1,3, (3) said homopolymers (1) and said copolymers (2) modified with a minor amount of maleic anhydride, and (4) said homopolymers (1) and said copolymers (2) modified with a minor amount of citraconic anhydride, said anhydrides being present in an amount no greater than 2% based on the weight of said polymers (1) and (2), (B) a substantially non-volatile, organic-solvent-soluble organic metal compound selected from the class consisting of orthotitanate esters and orthozirconate esters and (C) a volatile organic liquid mutual solvent for (A) and (B) having a boiling range within the limits of 80° C. to 220° C. and consisting essentially of at least one hydrocarbon solvent, said method comprising admixing in said coating composition an aliphatic monohydric alcohol (D) having up to 20 carbon atoms per molecule, in a stabilizing amount from at least 30% to about 400% based on the weight of said organic metal compound, component (B), the non-volatile content being from about 10% to 70% by weight of said liquid composition and said component (B) being present in the proportion of 1% to 15% based on the weight of said polymer component (A).

18. The method of claim 17 wherein said stabilizing alcohol contains from 6 to 8 carbon atoms per molecule and is admixed in an amount corresponding to 50% to 250% based on the weight of said organic metal compound, component (B), said organic metal compound being present in an amount corresponding to 1.5% to 6.0% based on the weight of said polymer component (A) having a molecular weight from about 1,000 to about 5,000.

19. A method of reducing the viscosity of a coating composition, characterized by viscosity instability and a viscosity bodied above its initial viscosity, consisting essentially of a solution of (A) at least one oily polymer of butadiene-1,3 having a molecular weight from about 1000 to about 5000 and being selected from the group consisting of (1) butadiene-1,3 homopolymers, (2) copolymers of butadiene-1,3 and styrene having at least 75% by weight of copolymerized butadiene-1,3, (3) said homopolymers (1) and said copolymers (2) modified with a minor amount of maleic anhydride, and (4) said homopolymers (1) and said copolymers (2) modified with a minor amount of citraconic anhydride, said anhydrides being present in an amount no greater than 2% based on the weight of said polymers (1) and (2), (B) a substantially non-volatile, organic-solvent-soluble organic metal compound selected from the class consisting of orthotitanate esters and orthozirconate esters and (C) a volatile organic liquid mutual solvent for (A) and (B) having a boiling range within the limits of 80° C. to 220° C. and consisting essentially of at least one hydrocarbon solvent, the non-volatile content of said composition being about 10% to 70% by weight and the relative proportion of said component (B) being from 1% to 15% based on the weight of said polymer component (A), said method comprising mixing with said unstable composition an aliphatic monohydric alcohol (D) having from 4 to 10 carbon atoms per molecule in an amount from 30% to 400% based on the weight of said organic metal compound, component (B), the resulting composition thereby exhibiting a stable viscosity lower than the viscosity resulting from dilution of said unstable composition with a corresponding amount of said hydrocarbon solvent (C).

References Cited in the file of this patent

UNITED STATES PATENTS

| 2,610,162 | Hoffman | Sept. 9, 1952 |
| 2,708,639 | Miller | May 17, 1955 |

FOREIGN PATENTS

| 125,450 | Australia | Sept. 25, 1947 |

OTHER REFERENCES

Du Pont Titanium Organics, "Titanium Acylates," 10–53, E. I. Du Pont de Nemours and Co., Inc. (3 pages).

Industrial and Engineering Chemistry, volume 47, No. 10, October 1955, pages 2091–2095.